United States Patent [19]

Hoffman

[11] Patent Number: 5,298,298
[45] Date of Patent: Mar. 29, 1994

[54] MICROSCOPIC TUBE MATERIAL

[75] Inventor: Wesley P. Hoffman, Lancaster, Calif.

[73] Assignee: The United States of America as represented by the Secretary of the Air Force, Washington, D.C.

[21] Appl. No.: 649,090

[22] Filed: Jan. 30, 1991

Related U.S. Application Data

[62] Division of Ser. No. 324,280, Mar. 15, 1989, Pat. No. 5,011,566.

[51] Int. Cl.$^5$ ............... C03C 25/06; B32B 5/12
[52] U.S. Cl. ............... 428/34.4; 428/34.6; 428/366; 428/367; 428/378; 428/379; 428/381; 428/388; 428/389; 428/397; 428/398; 428/426; 428/427; 428/428; 428/432; 428/433; 428/434; 428/542.8; 428/903; 156/643; 156/655
[58] Field of Search ............... 156/643, 655; 428/34.4, 428/34.6, 34.5, 366, 367, 388, 379, 389, 381, 397, 432, 433, 434, 542.8, 426, 427, 428, 903, 398, 378; 29/599

[56] References Cited

U.S. PATENT DOCUMENTS

| | | | |
|---|---|---|---|
| 2,717,203 | 9/1955 | van Laar | 65/31 |
| 2,879,147 | 3/1959 | Baker | 65/31 |
| 3,275,428 | 9/1966 | Siegmund | 65/31 |
| 3,400,291 | 9/1968 | Sheldon | 65/31 |
| 3,502,455 | 3/1970 | Leardner | 65/31 |
| 3,558,377 | 1/1971 | Tantillo | 65/31 |
| 3,826,560 | 7/1974 | Schultz | 65/3.12 |
| 3,925,583 | 12/1975 | Rau | 428/34.6 |
| 4,127,398 | 11/1978 | Singer, Jr. | 156/296 |
| 4,265,972 | 5/1981 | Rudner | 428/398 |
| 4,385,092 | 5/1983 | Singer, Jr. | 428/398 |
| 4,488,920 | 12/1984 | Danis | 156/89 |
| 4,532,171 | 7/1985 | Balkwill | 428/398 |
| 4,735,856 | 4/1988 | Schultz | 428/366 |
| 4,750,806 | 6/1988 | Biswas | 428/388 |
| 4,761,170 | 8/1988 | Mansfield | 65/18.4 |
| 4,812,344 | 3/1989 | Jaeger | 428/34.6 |
| 4,882,209 | 11/1989 | Maruyama | 428/34.6 |
| 4,982,068 | 1/1991 | Pollock et al. | 428/398 |
| 5,094,906 | 3/1992 | Witzke et al. | 428/398 |

OTHER PUBLICATIONS

Edie et al., Melt-Spun Non-Circular Carbon Fibers, *Carbon*, vol. 24, No. 4, 1986, pp. 477–482.

*Primary Examiner*—Ellis P. Robinson
*Assistant Examiner*—Rena L. Dye
*Attorney, Agent, or Firm*—Stanton E. Collier; Donald J. Singer

[57] ABSTRACT

This invention offers a unique method to fabricate unique, straight, curved, or coiled tubes as small as 1 micron (0.000004 inches) in diameter with wall thicknesses starting at less than 0.01 microns. These tubes can be made from many of the materials that can be applied to a surface of carbon, glass, or other tube forming fibers and then made to withstand the environment used to remove the fiber. A monolithic piece can be formed where the tubes are channels or holes.

18 Claims, 2 Drawing Sheets

MICROSCOPIC TUBE MATERIAL

STATEMENT OF GOVERNMENT INTEREST

The invention described herein may be manufactured and used by or for the Government for governmental purposes without the payment of any royalty thereon.

This application is a division of application Ser. No. 07/324,280 filed 15 Mar. 1989 now U.S. Pat. No. 5,011,566.

TECHNICAL FIELD

This invention relates to the manufacture of microscopic thread-like material and specifically to the manufacture of microscopic hollow tubes which are particularly useful in the manufacture of lightweight, thermal barrier and heat exchange materials.

BACKGROUND OF THE INVENTION

Lightweight, low mass material is widely used for thermal barrier protection shields and for lightweight structural components in devices such as aircraft that place a premium on structurally strong lightweight components. A variety of manufacturing methods are used to produce lightweight, structural materials. These methods include production of composite, non-metallic components and production of components having a reduced weight through the inclusion of spaces and holes. There are, however, limitations to the production of such reduced weight materials since conventional drilling of spaces and holes and electric die machining of holes are costly operations that raise the price of the final component. Other lightweight materials make use of fibers and laminations for producing components having good structural rigidity without the attendant weight of comparable metallic components. Production of materials having layers of fibers or fibrous material with ceramic or epoxy binders is also an expensive manufacturing procedure.

A need therefore exists for a new and inexpensive lightweight material suitable for use in lightweight components for devices such as aircraft.

A need also exists for an improved method of manufacturing hollow materials that are particularly useful for thermal insulation and alternately for gas separation applications.

A further need exists for an inexpensive and efficient method of producing lightweight raw materials for use in the above-mentioned lightweight and thermal insulating components.

SUMMARY OF THE INVENTION

The invention comprises a material composed of microscopic hollow tubes having a wall thickness in the range of 0.01 to 10,000 microns and a diameter in the range of 1.0 to 1000 microns. The tubes can be formed from a wide variety of materials, some of the preferred materials include silica, carbon, carbides, nitrides and oxides.

The invention also comprises a method for forming the microscopic hollow tubes. The method begins with the step of positioning fibers having a predetermined rate of oxidation at specific temperatures in a preform corresponding to a desired tube configuration. The fibers are then cleaned and the temperature of the fibers is adjusted to a preferred deposition temperature in an inert or non-oxidizing environment. A tube material is then deposited on the fibers to coat them. The tube material has a lower rate of oxidation at specific temperatures than the fibers. The coated fibers are then heated in an oxidizing environment to a temperature at which the fiber oxidize at a rate which is at least 10 times faster than the rate at which the fiber coating oxidizes. During this oxidation, there is no ignition of the fiber material or build up of gas pressure that would damage the tubes which remain after the fiber is removed.

In a preferred embodiment of the invention, the tube material is deposited on the fibers by chemical vapor deposition after the fibers have been cleaned in a high vacuum environment. In one preferred embodiment of the invention the initial fibers comprise carbon fibers, however, other microscopic fibers may be used. Silica and other high temperature oxides are preferred coating materials for the fibers in the preferred embodiment of the invention which utilizes carbon fibers.

In another preferred embodiment of the method of this invention, the fibers used for forming microscopic tubes are removed from the deposited tube material by means of a dissolving acid. The dissolving acid dissolves the inner fiber but is incapable of dissolving the tube material.

BRIEF DESCRIPTION OF THE DRAWINGS

The following and other objects and advantages of invention will be apparent from the following more particular description of the preferred embodiments of the invention.

An example of an embodiment of the invention is illustrated in the accompanying drawings. The drawings are not intended to limit the invention in size or shape but rather to illustrate a typical product produced according to the principles of this invention.

Figure 1:
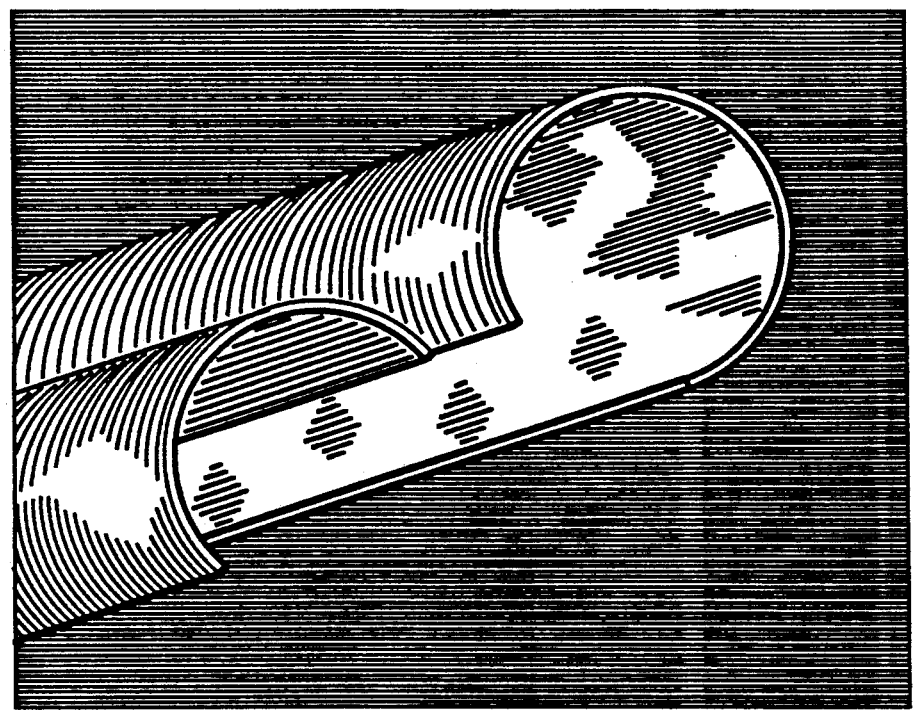

The drawings have been made from a scanning electron microscope showing the ends of some representative microscopic hollow tubes produced according to the principles of this invention. The tube ends in the drawings have been intentionally broken open longitudinally for inspection.

FIG. 1 illustrates two connected micron size hollow tubes.

Figure 2:
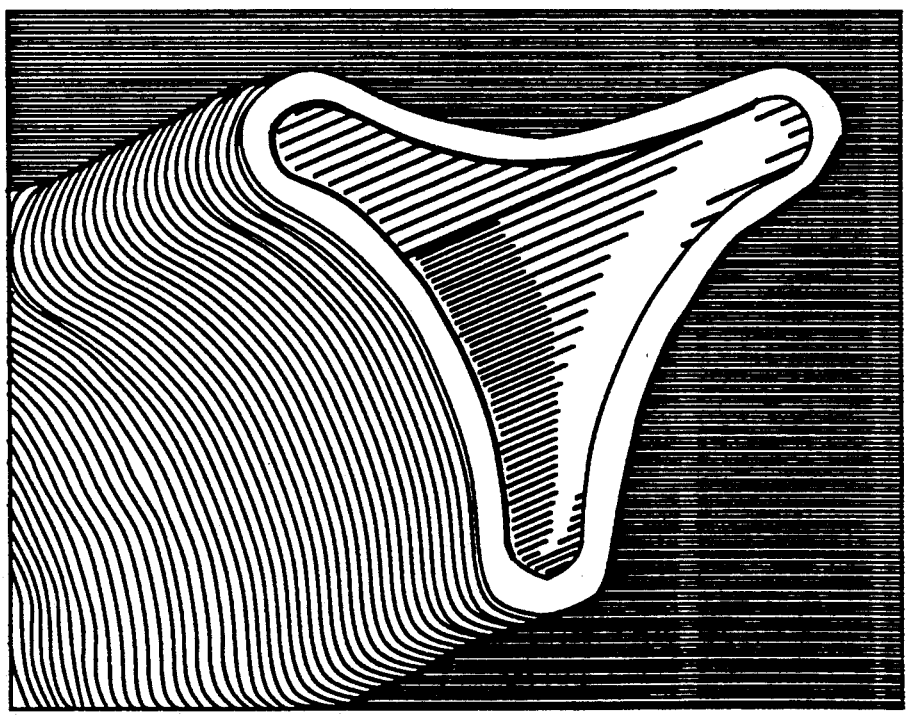

FIG. 2 illustrates a micron size hollow tube having a trilobal shape.

Figure 3:
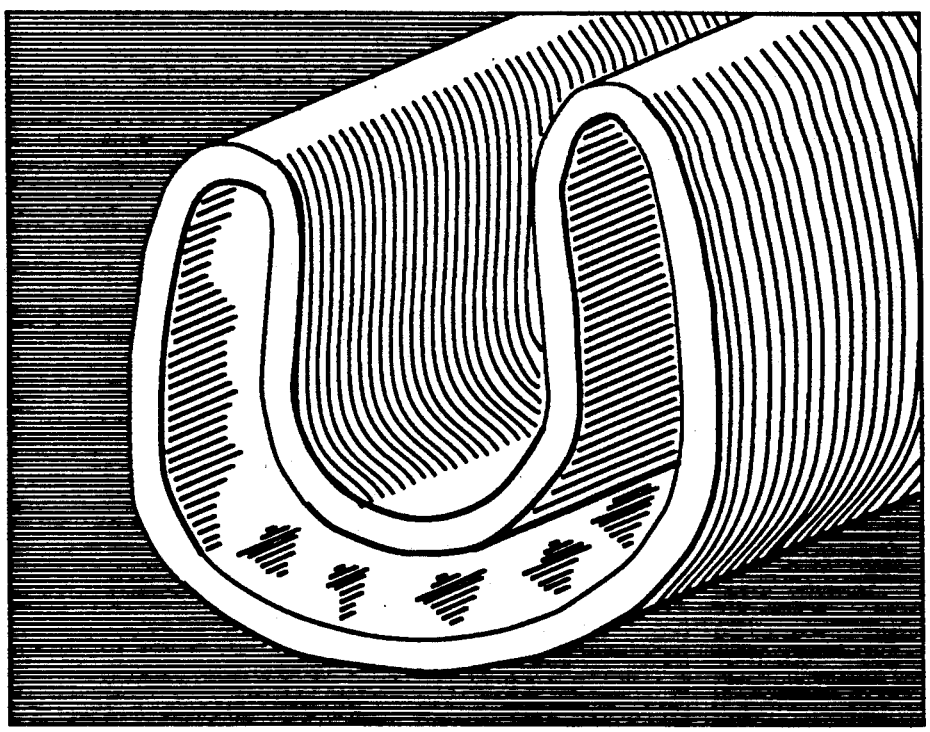

FIG. 3 illustrates a micron size hollow tube having a "C" shape.

Figure 4:

FIG. 4 illustrates a micron size hollow tube surrounded by a filler type material.

DETAILED DESCRIPTION OF THE PREFERRED EMBODIMENT

This invention offers a unique method to fabricate straight, curved, or coiled hollow tubes as small as 1 micron (0.000004 inches) in diameter with wall thicknesses starting at less than 0.01 microns. These tubes can be made from many of the materials that can be applied to a surface of carbon, graphite glass, or other tube forming fibers and then made to withstand the environment used to remove the fiber. Further, this invention permits the manufacture of monolithic bodies from preforms having micro channels or holes having diameters in the range of 1 to 1,000 microns.

The microscopic tubes are manufactured by applying a surface coating of material such as carbon, ferrous metal, non-ferrous metals, ceramic, oxides, nitrides, carbides, borides, semiconductor, glass, carbon or diamond to a microscopic fiber which is then removed.

This coating can be applied by several processes which include but are not limited to chemical vapor deposition, electrophoresis, and electroplating.

Prior to the coating process the fibers are fixed in the desired preform configuration, meaning the fibers are held or fixed in a desired shape, location and orientation to be rigid therein, for the finished tubes and then cleaned to facilitate uniform deposition of a coating material in a non-oxidizing or inert environment. The fibers are coated with a desired material that will form the tubes when the fibers are removed. For example, carbon or graphite fibers can be removed from a silica coating by reaction with a gas phase species such as air, oxygen or hydrogen or by dissolution in an acidic liquid medium. A glass fiber, for example, can be easily removed with hydrofluoric acid. The preferred method of removing other fiber materials depends on their chemical and physical structure. Once the fiber is removed, the microscopic tube of coating material or materials remains. These tubes have been found to be quite sound structurally. Even microscopic tubes made of quartz have been found to be very strong structurally. Specifically, quartz tubes with wall thicknesses of less than 0.1 microns have been found to be structurally sound.

Tubes formed in this way may be fabricated to stand alone in practically any shape imaginable, or the spaces between the tubes can be filled in to produce a strong lightweight monolithic structure containing micron size channels. These channels serve to lower structure weight through a reduction of density. Such structures utilize the innate high structural strength of hollow tubes to form strong structural components. Further, the hollow tubes form thermal barriers that reduce the passage of heat.

The basis for this invention is production of tubes of coating material that is not destroyed by the conditions used to remove the fibers. Two specific fabrication techniques for microscopic tube formation which utilize two different fiber substrates are presented below.

EXAMPLE 1

This example discloses the fabrication of quartz tubes and begins with a carbon or graphite fiber substrate. To form quartz tubes on graphitized carbon fibers it is preferred to start with unsized fibers as the substrate. Such fibers were laid up in a preform in a desired configuration and then cleaned of any adsorbed material by heating to 950° C. in the inert environment of a high vacuum apparatus. This step is essential to maintain uniform deposition rates and high quality tube walls. After the fibers were cleaned, their temperature was lowered to the deposition temperature of the desired coating material. In this example silica was used to form the tube walls. For silica, the preferred deposition temperature is between 550° and 650° C. when tetraethoxysilane is used as the precursor. Deposition was carried out at 600° C. until the desired wall (coating) thickness was obtained. In this example a wall thickness of 0.20 microns of silica on the fiber surface was selected. This deposition could have been performed in either a flow or static reactor, but in this example a static reactor was used. In order to fabricate a monolithic piece of silica (imbeding the carbon fibers) the deposition could have been continued in the reactor thus the silica acting as a bonding material. Alternately, the fiber preform can be removed from the reactor and densified by other means, such as, electrophoresis, electroplating, pack cementation, sol-gel, etc.

The removed preform had 0.2 microns of silica on the fiber surface. Having coated the tube forming fibers up to the desired depth the fibers were then oxidized in air. The carbon fibers were completely oxidized at 700° C. in air although silica tube material can withstand temperatures in excess of 1000° C. For coating materials that oxidize with detrimentally high rates at 700° C., lower temperatures must be used. It should be noted, however, that the rate of carbon oxidation decreases with temperature and approaches a negligible rate at 450° C. Using this method, the carbon disappeared leaving individual stand alone silica tubes, with length to diameter ratios in excess of 1500. The internal diameter was 10 microns with a wall thickness of 0.2 microns. To form diamond or diamond-like tubes, the carbon fibers would have been removed in a hydrogen environment. The tubes of example 1 are shown in the drawing of FIG. 1.

EXAMPLE 2.

To form carbon or graphite tubes from quartz fibers the process is very similar to that just described. After the quartz fibers are laid up in the desired configuration and cleaned, the temperature is adjusted for the appropriate deposition. The deposition temperature depends on the type of hydrocarbon used. In this example, propylene was used to deposit a carbon coating, this required a deposition temperature greater than 650° C. If methane had been used to deposit carbon on the quartz fiber the required deposition temperature would have been in excess of 800° C. The coated fiber was removed from the deposition reactor after the desired thickness of carbon had been deposited upon the quartz tube in a non-oxidizing environment. The quartz fiber substrate was then removed by treatment with hydrofluoric acid. This process resulted in the formation of structurally stable carbon tubes The two examples described above demonstrate the manufacture of microscopic tubes (or passages in structures) orders of magnitude smaller than any previously known. The tubes have the orientation of the fibers according to the way they are laid out during deposition. Free-standing micro tubes with a diameter in the range of 1.0–1000 microns can hereby be fabricated. The diameter of 1.0 micron has been selected as our lower limit because the smallest commercial continuous fibers now available are about 3.5 microns in diameter. In sizes below 3.0 microns the fibers can become a health hazard similar to asbestos fibers. When a monolithic body is formed from the fibers a multitude of micro channels are formed when the fibers are removed. Fabrication of materials having a multitude of micro channels will greatly reduce component weight without greatly affecting structural strength. In some instances proper tube orientation will actually give a micro channel lightweight material greater strength and less weight than amorphous structures.

The micro tubes can be coated on the outside or inside with other materials after the fibers have been removed. Careful selection of coatings in combinations with the original tube material will allow formation of microsensors or detectors far smaller than those now available.

Structurally sound free-standing tubes can have a wall thickness of less than 0.1 microns. Specifically, hollow tubes can be formed having a wall thickness less than 0.01 to 10,000 microns.

The preferred fibers are carbon and graphite. Among their advantages, carbon and graphite are relatively chemically inert at temperatures below 2000° C. and do not react with most materials. In this case graphite des not outgas appreciably below 1500° C., so bubbles are not introduced into the tube structure during deposition. Further, graphite is a high temperature material that can be used to form tubes at higher temperatures than other fibers can survive. Other filaments, however, may be best for specific purposes. For example, quartz fibers are probably the best for fabricating carbon, diamond and diamond-like tubes.

If a carbon fiber is used as a tube forming substrate, it can be removed by various means:

If the tube material cannot withstand high temperature, the carbon fiber can be removed in an oxygen plasma at temperatures below 100° C.

The carbon fiber can also be removed in a liquid medium in an acid such as boiling nitric acid at 90° C.

If the tube material is changed or damaged in an oxidizing environment, a reducing environment can be used to remove the carbon fiber. Although lower temperatures can be used, carbon can be removed at a significant rate in hydrogen by forming methane at 1000° C. The hydrogen pressure should be at least atmospheric and preferably above 10 atmospheres in order to get a rate of removal that would be commercially significant.

The carbon fiber can also be removed at a significant rate by subjecting it to steam at atmospheric or sub-atmospheric pressure at temperatures above 725° C.

Carbon dioxide at atmospheric or sub-atmospheric pressure can be used to remove carbon fibers at a significant rate at temperatures as low as 700° C.

Carbon fibers can be removed at a significant rate by exposure to oxygen or air at temperatures above 450° C. For forming tubes, the lower the carbon removal temperature the better. This is to minimize the rate of gasification so that gas pressure will not build up inside the tubes and fracture the thin tube walls.

This invention offers the ability to produce tubes out of a variety of materials with diameters in the micron range and walls of submicron thickness. Any material with a melting point above approximately 450° C. can be used for deposition on a carbon or graphite fiber. These materials would include the elements listed below and compounds (ferrous and non-ferrous metals, alloys, oxide, nitrides, carbides, borides, etc.) with a melting or sublimation point greater than 450° C. We have chosen 450° C. because the rates of carbon and graphite oxidation decrease with temperature and approach a negligible rate at 450° C. Below 450° C. it would not be commercially feasible to remove the carbon fiber by gaseous oxidation although the carbon could be removed by atomic oxygen or acid treatment. The elements that we consider useful for deposition on carbon to form microscopic hollow tubes are:

| ALUMINUM | MAGNESIUM | SILICON |
| --- | --- | --- |
| BORON | MANGANESE | SILVER |
| CERIUM | MOLYBDENUM | TANTALUM |
| CHROMIUM | NICKEL | THORIUM |
| COBALT | OSMIUM | TITANIUM |
| COPPER | PALLADIUM | TUNGSTEN |
| GOLD | PLATINUM | ZIRCONIUM |
| HAFNIUM | RHENIUM | URANIUM |

-continued

| IRIDIUM | RHODIUM |
| --- | --- |
| IRON | RUTHENIUM |

In addition, materials that are not soluble in nitric acid or damaged by atomic oxygen can be used on carbon even if their melting point is below 450° C. Any material that is not attacked by hydrofluoric acid can be used for deposition on quartz fibers.

The tubes of this invention form a unique and valuable raw material that can be fabricated into composites used in lightweight high strength structures. These hollow tubes, because of their extremely low weight yet relatively high strength, form the ideal material for the lightweight composite structures for the aircraft and spacecraft of the future.

So called "breathing structures" can also be made of these tubes that will allow gas transfer in only selected directions. Further, the hollow spaces in the tubes impede heat transfer when appropriately encapsulated. Such lightweight heat shield structures are in great demand for hypersonic air vehicles and spacecraft.

Through careful fabrication, a variety of other devices can be produced using the microscopic hollow tubes; these include high efficiency heat exchanges and micro heat exchanges. Extremely accurate injectors for liquid fuel rocket engines can be designed by carefully controlling the form and internal diameter of the encapsulated tubes. Other potential uses include low cost gas separation systems and light intensifier arrays. Microscopic fibers, hollow tubes and structures having microscopic holes or channels clearly have almost innumerable applications in the fields of lightweight structures, rocket propulsion, medicine, optics, micro hydraulics and electronics.

While the invention has been described with reference to the preferred embodiments thereof it will be understood by those skilled in the art that various changes in substance and form can be made therein without departing from the scope and spirit of the invention as detailed in the appended claims.

What is claimed is:

1. A tube preform, comprising:
   a plurality of microscopic hollow tubes, said microscopic hollow tubes being oriented in a predetermined configuration and having an inner diameter in the size range of about 1 micron to less than 50 microns, said microscopic hollow tubes having a wall thickness in the size range of from about 0.01 microns to about 10,000 microns, said tubes being formed on fibers having an outer diameter equal to said inner diameter of said tubes, the fibers being removed to leave said tubes, said tubes being originally formed in its final shape and diameter, and
   a bonding material, said bonding material holding said hollow tubes in the shape of said preform.

2. A preform as defined in claim 1 wherein said hollow tubes are formed of a material selected from the group consisting of:
   ferrous metals;
   non-ferrous metals;
   borides
   carbon
   carbides
   nitrides;
   oxides and
   silicon.

3. A tube preform as defined in claim 1 wherein said microscopic hollow tubes have a cross sectional shape being selected from the group consisting of: circular, oval, rectangular, square, triangular, trilobal, multilobal, or C shaped.

4. A monolithic body comprising at least one preform, each preform being made up of a plurality of microscopic hollow tubes oriented in a predetermined configuration and having an inner diameter in the size range of from about 1 micron to less than 50 microns, said microscopic hollow tubes having a wall thickness in the size range of from about 0.01 microns to about 10,000 microns, a material filling spaces between said microscopic hollow tubes, said material being of a different composition than said tubes, said tubes being formed on fibers having an outer diameter equal to said inner diameter of said tubes, the fibers being removed to leave said tubes, said tubes being originally formed in its final shape and diameter.

5. A monolithic body as defined in claim 4 wherein said microscopic hollow tubes are formed of a material selected from the group consisting of ferrous metals, non-ferrous metals, borides, carbon, carbides, nitrides, oxides and silicon.

6. A monolithic body as defined in claim 4 wherein at least one layer of material is deposited on the inside of said tubes.

7. A monolithic body as defined in claim 4 wherein at least one layer of material is deposited on the outside of said tubes.

8. A monolithic body as defined in claim 4 wherein the hollow tubes have a cross sectional shape being selected from the group consisting of: circular, oval, rectangular, square, triangular, trilobal, multilobal, or C shaped.

9. A monolithic body comprising at least one preform, each preform being made up of a plurality of microscopic hollow tubes oriented in a predetermined configuration and having an inner diameter which can range in size from about 1 micron to about 4 microns, said microscopic hollow tubes having a wall thickness which can range in size from about 0.01 microns to about 10,000 microns, a material filling spaces between said microscopic hollow tubes, said material being of the same composition as said tubes, said tubes being formed on fibers having an outer diameter equal to said inner diameter of said tubes, the fibers being removed to leave said tubes, said tubes being originally formed in its final shape and diameter.

10. A monolithic body as defined in claim 9 wherein said hollow tubes are formed of a material selected from the group consisting of ferrous metals, non-ferrous metals, borides, carbon, carbides, nitrides, oxides and silicon.

11. A monolithic body as defined in claim 9 wherein at least one layer of material is deposited on the inside of said tubes.

12. A monolithic body as defined in claim 9 wherein at least one layer of material is deposited on the outside of said tubes.

13. A monolithic body as defined in claim 9 wherein the hollow tubes have a cross sectional shape being selected from the group consisting of: circular, oval, rectangular, square, triangular, trilobal, multilobal, or C shaped.

14. A free-standing microscopic hollow tube, said free-standing microscopic hollow tube comprising a single microscopic hollow tube having an inner diameter in the size range of about 1 micron to less than 50 microns and having a wall thickness in the size range of from 0.01 microns to about 10,000 microns, said tube being formed on a fiber having an outer diameter equal to said inner diameter of said tube, the fiber being removed to leave said tube.

15. A free-standing microscopic hollow tube as defined in claim 14 wherein said hollow tube is formed of a material selected from the group consisting of ferrous metals, non-ferrous metals, borides, carbon, carbides, nitrides, oxides and silicon.

16. A free-standing microscopic hollow tube as defined in claim 14 wherein at least one layer of material is deposited on the inside of said tube.

17. A free-standing microscopic hollow tube as defined in claim 14 wherein at least one layer of material is deposited on the outside of said tube.

18. A free-standing microscopic hollow tube as defined in claim 14 wherein said hollow tube has a cross sectional shape being selected from the group consisting of: circular, oval, rectangular, square, triangular, trilobal, multilobal, or C shaped.

* * * * *